United States Patent [19]

Uzuka

[11] 4,446,406

[45] May 1, 1984

[54] BRUSHLESS DC MOTOR DRIVING CIRCUIT

[75] Inventor: Mitsuo Uzuka, Kanagawa, Japan

[73] Assignee: Sony Corporation, Tokyo, Japan

[21] Appl. No.: 479,868

[22] Filed: Mar. 29, 1983

[30] Foreign Application Priority Data

Apr. 2, 1982 [JP] Japan .................................. 57-54871

[51] Int. Cl.³ ........................................... H02K 23/00
[52] U.S. Cl. ..................................... 318/254; 318/138;
318/439; 318/696; 318/314; 318/318; 318/256;
318/280
[58] Field of Search ................. 318/138, 254, 439, 696

[56] References Cited

U.S. PATENT DOCUMENTS

| 4,172,990 | 10/1979 | Everett et al. | 318/138 X |
| 4,262,236 | 4/1981 | Gelenius et al. | 318/439 X |
| 4,262,237 | 4/1981 | Gelenius | 318/439 X |
| 4,388,571 | 6/1983 | Tada et al. | 318/138 X |
| 4,393,339 | 7/1983 | Kimura | 318/138 X |

FOREIGN PATENT DOCUMENTS

| 38694 | 10/1981 | European Pat. Off. |
| 1141414 | 1/1969 | United Kingdom . |
| 1315752 | 5/1973 | United Kingdom . |
| 1351144 | 5/1974 | United Kingdom . |
| 1510876 | 3/1975 | United Kingdom . |
| 2047027 | 11/1980 | United Kingdom . |
| 2073513 | 10/1981 | United Kingdom . |

Primary Examiner—J. V. Truhe
Assistant Examiner—Shik Luen Paul Ip
Attorney, Agent, or Firm—Lewis H. Eslinger; Alvin Sinderbrand

[57] ABSTRACT

A driving circuit for a brushless DC motor is connected to energize the plurality of stator windings by detecting induced voltages in windings adjacent an energized winding, mixing these detected voltages in predetermined ratios, and comparing the mixed voltages with a reference level, in order to provide switch controlling signals fed to switches arranged between each of the plurality of stator windings and the energization source. Individual detectors to detect rotor position corresponding to the winding being energized are not required and delay circuits used to provide sequential pulses are also eliminated thereby promoting fabrication of the invention using integrated circuit technology.

25 Claims, 6 Drawing Figures

BRUSHLESS DC MOTOR DRIVING CIRCUIT

BACKGROUND OF THE INVENTION

1. ld of the Invention

The present invention relates generally to a driving circuit for a brushless DC motor and, more particularly, relates to a driving circuit to provide driving pulses to the stator without requiring a rotor position detecting element.

2. Description of the Prior Art

In brushless DC motors of the kind normally used in video tape recorders, the stator is typically formed having a three-phase coil with the driving current being sequentially supplied to each coil each time the rotor rotates through an angle of 120°. Generally, a rotor position detector is employed to detect the rotational position of the rotor so that the driving current can be applied to the correct stator coil. When utilizing a brushless DC motor of this kind, timing control is very important to switch properly the flow of current through the three-phase stator coil in phase with the rotor position in order to produce optimum torque. Typically, three individual rotor position detectors are arranged at equal intervals corresponding to the electrical angles of 120°. It is known to utilize magneto-sensitive elements, such as Hall effect devices, for such rotor position detectors.

Use of these individual rotary position detectors is generally troublesome both from the installation and calibration standpoints. Accordingly, it became known to provide rotor detection without the use of physically separate individual rotor detection elements. For example, a brushless DC motor driving circuit that does not employ individual rotor detecting elements is described in U.S. Pat. No. 3,997,823, assigned to the assignee hereof.

While the system described in this patent performs the task of driving the brushless DC motor without the use of separate dedicated rotor position sensors, the circuit used in the system is not one which can be advantageously embodied in an integrated circuit. One reason for this is that the drive circuit described in this patent requires time delay elements that involve the use of capacitors, and capacitors are devices that can not be readily formed in semi-conductor integrated circuits.

SUMMARY AND OBJECTS OF THE INVENTION

Accordingly, it is an object of the present invention to provide a driving circuit for a brushless DC motor that does not require individual discrete rotor position detectors and is of a configuration amenable to fabrication using integrated circuit technology.

It is another object of the present invention to provide a driving circuit for a brushless DC motor that does not require time delay elements in the driving circuit.

In one aspect of the present invention a driving circuit for brushless DC motors is provided having a number of switching circuits, each of which is connected in series with the plurality of windings forming the stator of the motor, for sequentially supplying the appropriate driving currents. The switching circuits are driven by a corresponding number of comparator circuits that compare a predetermined voltage with the voltages being induced in the various windings. In this fashion appropriate timing is provided without the requirement for time delay circuits or for the use of discrete individual rotor position sensors.

The above and other objects, features, and advantages of the present invention will become apparent from the following detailed description of an illustrative embodiment that is to be read in conjunction with the accompanying drawings, in which the same reference numerals identify the corresponding elements and parts in the several views.

DETAILED DESCRIPTION OF PREFERRED EMBODIMENTS

Figure 1:
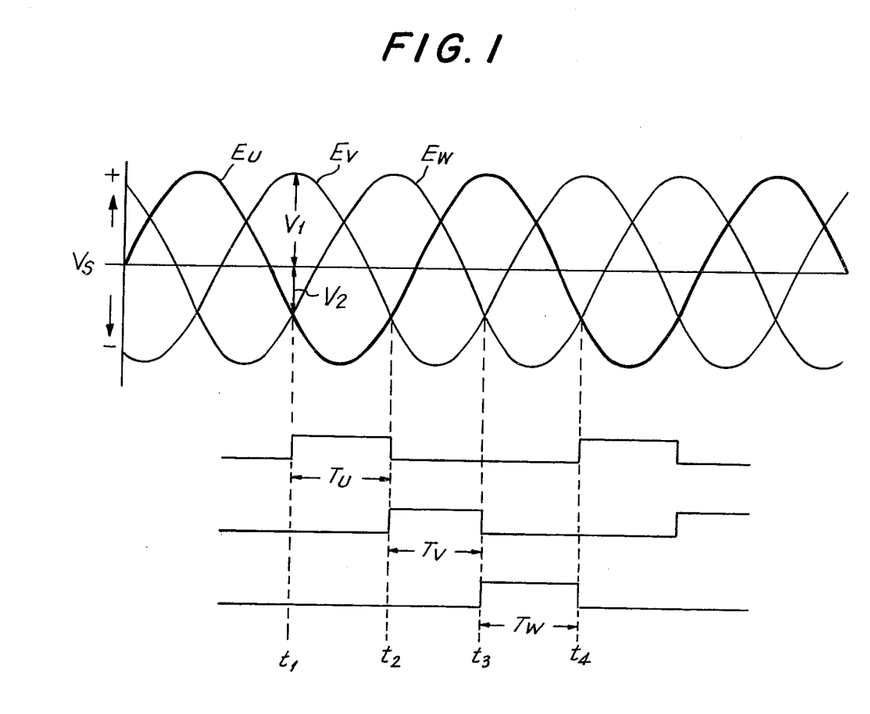
FIG. 1 represents waveforms of voltages induced in the windings of a brushless DC motor stator showing the driving pulses provided by the inventive driving circuit.

FIG. 1 shows the relationship between the induced voltages in the three coils present in the stator of a three-phase brushless DC motor. The coils are shown schematically in FIG. 2, which is an embodiment of the driving circuit of the present invention. More specifically, the stator coils of the brushless motor are identified in FIG. 2 as $1_W$, $1_V$, and $1_U$. As seen in FIG. 1, the voltages induced in these three windings $E_U$, $E_V$, $E_W$ each have a substantially sinusoidal waveform. These induced voltages $E_U$, $E_V$, and $E_W$ are generated by the U-phase, V-phase and W-phase coils, respectively, and have a phase shift of $\frac{2}{3}\pi$ with each other. Such phase relationship derives from the physical arrangement of the coils. The phase relationships between the induced voltages $E_U$, $E_V$, and $E_W$ may be expressed by the following equations:

$$E_U = \sin \theta \ldots \quad (1)$$
$$E_V = \sin(\theta - \tfrac{2}{3}\pi) \ldots \quad (2)$$
$$E_W = \sin(\theta - 4/3\pi) \ldots \quad (3)$$

The ON times of the pulses used to drive the appropriate stator windings to produce the above induced voltages, represented in FIG. 1 as $T_U$, $T_V$, and $T_W$, define time intervals during which the corresponding induced voltages, as shown in FIG. 1, fall within a range of one to one-half times the negative peak value of the reference voltage $V_S$. These time intervals correspond to the electrical phase angles of 120°. Assuming that the U-phase, V-phase, and W-phase coils of the motor are sequentially energized, an induced voltage $V_2$ in the first phase coil and an induced voltage $V_1$ in the next phase coil have the mutual relationship of $V_1:V_2=2:1-1$, at times $t_1$, $t_2$, $t_3$, and $t_4$, respectively. Therefore the ON times $T_U$, $T_V$, and $T_W$ and the induced voltages $E_U$, $E_V$, and $E_W$ will maintain the following relationships:

$$T_U(t_1 \rightarrow t_2) = E_V/2 + E_U \leq V_S \rightarrow E_W/2 + E_V = V_S \quad (4)$$

$$T_V(t_2 \rightarrow t_3) = E_W/2 + E_V \leq V_S \rightarrow E_U/2 + E_W = V_S \quad (5)$$

$$T_W(t_3 \rightarrow t_4) = E_U/2 + E_W \leq V_S \rightarrow E_V/2 + E_U = V_S \quad (6)$$

The motor drive circuit for the brushless DC motor is operable to detect the induced voltages $E_U$, $E_V$, and $E_W$ and, thus, to set the time intervals $T_U$, $T_V$, and $T_W$ so as to satisfy the relationships above at (4), (5) and (6), respectively.

Figure 2:
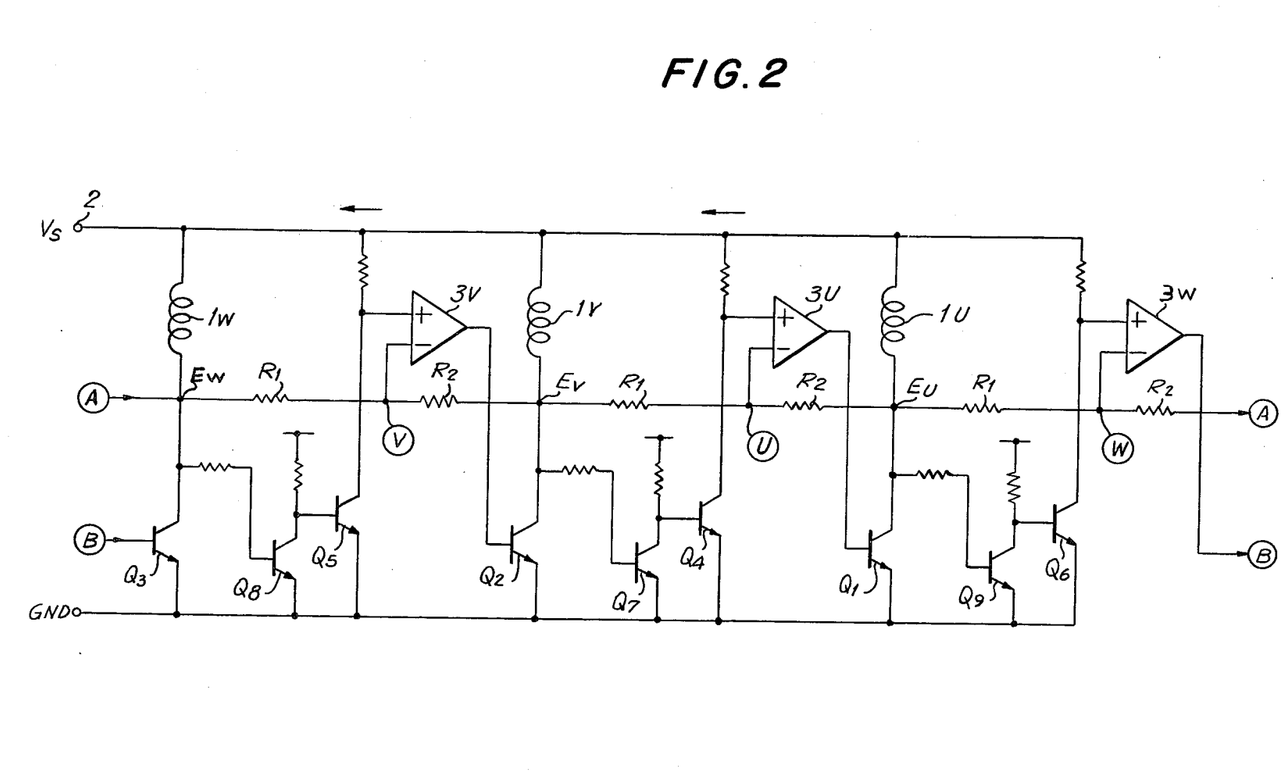
FIG. 2 is a schematic of a brushless DC motor driving circuit according to the present invention.

The drive circuit provided by the present invention is shown in FIG. 2, and the principle of operation of this circuit is in accordance with the above equations. In the circuit of FIG. 2, U-phase, V-phase and W-phase coils $1_U$, $1_V$ and $1_W$ are sequentially energized, respectively, by a current provided from power source terminal 2 at a reference voltage level $V_S$ at times when transistors $Q_1$, $Q_2$, and $Q_3$ are turned ON, respectively, and the induced voltages $E_U$, $E_V$, and $E_W$ appear across the stator coils $1_U$, $1_V$, and $1_W$. Transistors $Q_1$, $Q_2$, and $Q_3$ are turned ON when their base circuits receive outputs of a relatively high level from comparators $3_U$, $3_V$, and $3_W$, respectively. The inverting inputs of comparators $3_U$, $3_V$, and $3_W$ are connected to induced voltage detection points U, V, and W, respectively. The non-inverting inputs of comparators $3_U$, $3_V$, and $3_W$ are connected to the collector circuits of transistors $Q_4$, $Q_5$, and $Q_6$, respectively. The operation of transistor $Q_4$ is controlled by transistor $Q_2$ acting through transistor $Q_7$; the operation of transistor $Q_5$ is controlled by transistor $Q_3$ acting through transistor $Q_8$; and the operation of transistor $Q_6$ is controlled by transistor $Q_1$ acting through transistor $Q_9$.

One end of each of the three stator coils $1_U$, $1_V$, and $1_W$ is commonly connected through the induced voltage resistors $R_1$ and $R_2$. More specifically, between one end of coil $1_W$ and the corresponding end of coil $1_V$ are arranged two series-connected resistors $R_1$ and $R_2$, similarly, between ends of coil $1_V$ and $1_U$ are arranged two series-connected resistors $R_1$ and $R_2$, and again between the ends of coil $1_U$ and $1_W$ are arranged two series-connected resistors $R_1$ and $R_2$. Note that in the schematic of FIG. 2, the circuit points A are connected together as are the circuit points B, thus essentially providing a continuous network. The nodes between the respective pairs of series-connected resistors $R_1$ and $R_2$ are designated by reference symbols V, U, and W, as shown in FIG. 2. The ratio of the resistance value of each resistor $R_1$ to that of the corresponding resistor $R_2$ is selected to be 2:1. Accordingly, at detection point U a voltage ($E_V/2+E_2$) will be detected, similarly, at detection point V voltage ($E_W/2+E_V$) is detected; and at detection point W voltage ($E_U/2+E_W$) will be similarly detected.

The operation of the motor drive circuit of FIG. 2 is set forth hereinafter. Assuming that the output from comparator $3_U$ goes high at time $t_1$, that transistor $Q_1$ is turned ON, and coil $1_U$ is then energized, transistor $Q_2$ is OFF, transistor $Q_7$ is ON, and transistor $Q_4$ is OFF, thus, the non-inverting input of comparator $3_U$ is maintained at a level substantially equal to the power source voltage $V_S$. The voltage at detection point U is also kept at substantially the power source $V_S$ and, therefore, the output of comparator $3_U$ is maintained high. Transistor $Q_3$ is also OFF, transistor $Q_8$ is ON and transistor $Q_5$ is OFF, therefore, the non-inverting input of comparator $3_V$ is also maintained at substantially the level of the power source voltage $V_S$. The voltage at detection point V will be higher than the power source voltage $V_S$, so that the output from comparator $3_V$ will go low to almost the ground potential, thereby turning OFF transistor $Q_2$. Since transistor $Q_1$ is already ON, its corresponding transistor $Q_9$ must be OFF and transistor $Q_6$ is ON, and the non-inverting input of comparator $3_W$ is therefore kept at a low level relative to the inverting level. Meanwhile, the voltage at detection point W will be higher than the power source voltage $V_S$, so that the output from comparator $3_W$ will go low, thereby turning OFF transistor $Q_3$. When the rotor is rotated through an electrical angle of 120° before time $t_2$ as shown in FIG. 1, the voltage at detection point V will be equal to $V_S$, thereby driving the output from comparator $3_V$ high. Transistor $Q_2$ will then be turned ON, thereby energizing coil $1_V$ and, at the same time, transistor $Q_7$ is turned OFF and transistor $Q_4$ is turned ON. This means that the non-inverting input of comparator $3_U$ will go low in relation to the inverting input. In this condition, since the voltage at detection point U is higher than the ground potential, then the output from comparator $3_U$ will go low. In this fashion transistor $Q_1$ is turned OFF, thereby de-energizing coil $1_U$. At the time when transistor $Q_1$ is turned OFF, transistor $Q_9$ is turned ON, and transistor $Q_6$ is turned OFF. Thus, the non-inverting input of comparator $3_W$ is set to a voltage substantially equal to the voltage supply $V_S$ and in this condition, since the voltage at detection point W is higher than the power source voltage $V_S$, the output from comparator $3_W$ is maintained at a relatively low level, thereby keeping transistor $Q_3$ OFF and disabling or de-energizing coil $1_W$.

At time $t_3$, as shown in FIG. 1, all circuit elements are brought into the next phase of operation, with such operation being identical to the previous phase of operation, as described above. As a result of this operation, W-phase coil $1_W$ is energized, while V-phase $1_V$ is de-energized, and U-phase coil $1_U$ is kept in an OFF state. This may be clearly seen from the induced voltages shown in FIG. 1. At time $t_4$, the initial operating condition as described above with relation to time $t_1$ is commenced once again, and the three-phase operating cycle is repeated. In such three-phase operating cycle, the mathematical or physical relations in equations (4), (5), and (6) above are sequentially satisfied, so that the ON times $T_U$, $T_V$, and $T_W$ are sequentially set.

The drive circuit described above in relation to FIG. 2 is intended to drive a brushless DC motor in a forward direction. This same circuit approach may be utilized to drive a brushless DC motor in either the forward or reverse direction and such circuit is described in relation to the waveforms of FIG. 3 and the circuit diagram of FIG. 4. In FIG. 1, the U-phase coil, the V-phase coil, and the W-phase coil were sequentially energized in that order to drive the motor in the forward direction. In order to drive the motor in the reverse rotational direction, it is necessary to energize the coils in the order: U-phase coil, W-phase coil and V-phase coil. If this reverse operation is to be performed by the circuit described above in relation to FIG. 2, a voltage corresponding to the sum of induced voltage $E_U$ from coil $1_U$ and one half of the induced voltage from coil $1_W$ must be applied to the non-inverting input of comparator $V_U$ for the period during which the U-phase coil is kept ON. When time interval $T_U$ has elapsed, coil $1_W$ must be energized, and the output from comparator $3_W$ must be maintained unchanged in order to keep the V-phase coil OFF. When the W-phase coil and V-phase coil are ON, and the time intervals $T_W$ and $T_V$ have elapsed, respectively, the operation described above must be performed again.

Figure 3:
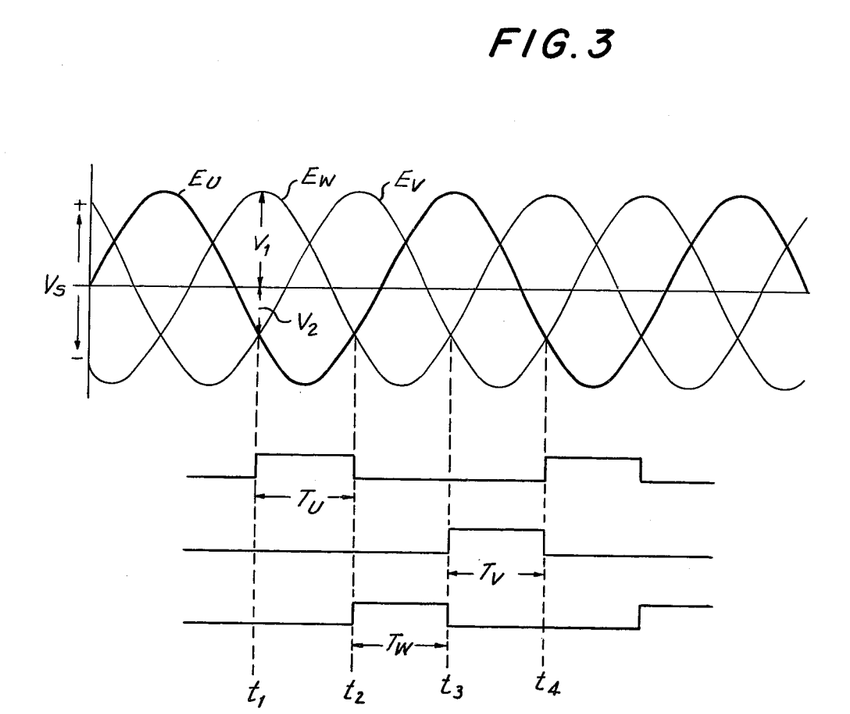
FIG. 3 represents waveforms of voltages induced in a brushless DC motor stator showing the driving pulses provided by the present invention for driving the motor in a reverse direction opposite that shown in FIG. 1.
Figure 4:
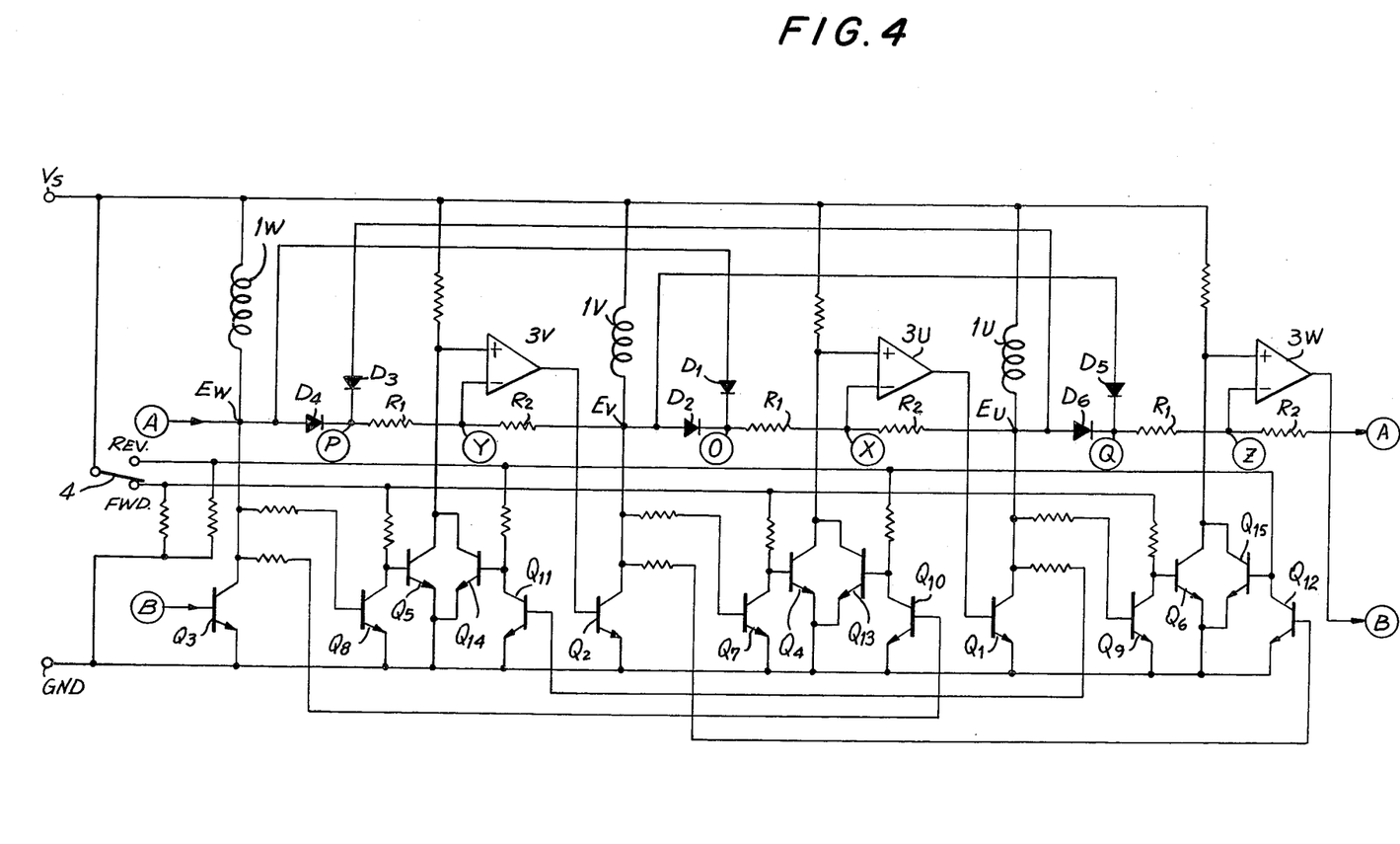
FIG. 4 is a schematic of another embodiment of the driving circuit of the present invention having apparatus for driving the brushless DC motor in either the forward or reverse direction.

FIG. 3 shows the relationships among the induced voltages $E_U$, $E_V$, and $E_W$, as well as the time intervals $T_U$, $T_V$, and $T_V$, in the drive circuit shown in FIG. 4 to cause reverse rotation of the brushless DC motor described above. FIG. 4 is a schematic of another embodiment of the present invention, wherein the same reference numerals as used in FIG. 1 denote similar parts in the circuit of FIG. 4.

FIG. 3 shows the relationship between the induced voltages and the energization times and the system operates in accordance with the following:

$$T_U(t_1 \rightarrow t_2) = E_W/2 + E_U \leq V_S \rightarrow E_V/2 + E_W = V_S \quad (7)$$

$$T_W(t_2 \rightarrow t_3) = E_V/2 + E_W \leq V_S \rightarrow E_U/2 + E_V = V_S \quad (8)$$

$$T_V(t_3 \rightarrow t_4) = E_U/2 + E_V \leq V_S \rightarrow E_W/2 + E_U = V_S \quad (9)$$

Referring now to the schematic of FIG. 4, detection points X, Y, and Z correspond to the voltage detection points U, V, and W of the circuit of FIG. 2. The induced voltage of the corresponding phase, and voltages corresponding to one-half of the induced voltages of each of the two adjacent phases, appear at detection points X, Y, and Z. More specifically, the induced voltage $E_U$ that corresponds to one-half of the induced voltage $E_W$ from coil $1_W$ is supplied through diode $D_1$ and its corresponding resistor $R_1$ and a voltage corresponding to one-half of the induced voltage $E_V$ from coil $1_V$ is supplied through diode $D_2$ and its corresponding resistor $R_1$ and both appear at detection point X. Similarly, induced voltage $E_V$, which corresponds to one-half of the voltage $E_U$ from coil $1_U$ supplied through diode $D_3$ and its corresponding resistor $R_1$, and a voltage corresponding to one-half of the voltage $E_W$ supplied from coil $1_W$ through diode $D_4$ and its corresponding resistor $R_1$ appear at detection point Y. Continuing the induced voltage $E_W$, which corresponds to one-half of the voltage $E_V$ supplied from coil $1_V$ through diode $D_5$ and its corresponding resistor $R_1$, and a voltage corresponding to half of the voltage $E_U$ supplied from coil $1_U$ through diode $D_6$ and its corresponding resistor $R_1$, appear at the detection point Z.

In order to operate the circuit in either the forward and reverse direction modes, a forward/reverse changeover switch 4 is arranged to selectively supply the power source voltage $V_S$ to the appropriate driving transistors. Specifically, transistors $Q_7$, $Q_8$, and $Q_9$ are connected to obtain forward rotation of the motor, whereas transistors $Q_{10}$, $Q_{11}$, and $Q_{12}$ are arranged for reverse motor rotation. Depending upon the operation of switch 4, the power source voltage source $V_S$ is supplied to the collector circuits of either transistors $Q_7$, $Q_8$, $Q_9$ or of transistors $Q_{10}$, $Q_{11}$, $Q_{12}$. Transistors $Q_{13}$, $Q_{14}$, and $Q_{15}$, which are operable for reverse motor rotation, are arranged in parallel with transistors $Q_4$, $Q_5$, and $Q_6$ which are functional for forward motor rotation. The ON/OFF operation of transistors $Q_{13}$, $Q_{14}$, and $Q_{15}$ is controlled by transistors $Q_{10}$, $Q_{11}$, $Q_{12}$, respectively. In the forward motor rotation mode, transistors $Q_1$, $Q_2$, and $Q_3$ control transistors $Q_9$, $Q_7$, and $Q_8$, respectively, whereas, in the reverse mode, transistors $Q_1$, $Q_2$, and $Q_3$ control transistors $Q_{11}$, $Q_{12}$, and $Q_{10}$, respectively.

In the brushless DC motor drive circuit of FIG. 4, when switch 4 is operated for reverse motor rotation, a circuit substantially equivalent to that described in relation to FIG. 2 is obtained. Specifically, coils $1_U$, $1_V$, and $1_W$ are sequentially energized during time intervals $T_U$, $T_V$, and $T_W$, respectively, in accordance with the timing pattern shown in FIG. 1. As a result of such configuration, the motor rotates in the forward direction. In the situation when switch 4 is actuated to obtain reverse motor rotation, a circuit having an opposite order of sequential phase energization opposite that shown in FIG. 2 is obtained. Specifically, coils $1_U$, $1_W$, and $1_V$ are sequentially energized in that order during time intervals $T_U$, $T_W$, and $T_V$, respectively, in accordance with the timing pattern shown in FIG. 3. As a result of such operation, the motor will rotate in the reverse direction relative to the forward direction described above.

While the above-described circuits relate to the driving of the brushless DC motor, none of these circuits are efficient to act as a starting circuit to commence rotation of the rotor of the motor in either direction. A starting circuit for such motor for use with the inventive driving circuit is set forth hereinafter. In the circuits of the embodiments shown in FIGS. 2 and 4, when the rotor is started to generate an induced voltage, the phase coil to be energized can be detected. Nevertheless, at the time when the power is instantaneously supplied the motor will not operate, since the rotor has not yet rotated and no starting torque is present, accordingly a separate starting circuit is required. To provide the starting torque, the invention teaches that only one phase coil need be energized in the circuit of FIG. 4. The energization order is predetermined by the position of switch 4. When the rotor is in the at-rest position, a trigger voltage that is lower in level than the power source voltage $V_S$ is simultaneously applied to points O, P, and Q. When switch 4 is in the forward rotation position, one of the relationships of equations (4),(5), and (6) above will be satisfied. On the other hand, when switch 4 is actuated to the reverse motor rotation position, one of the relationships relative to equations (7), (8), and (9) above will be satisfied. Therefore, one of the coils $1_U$, $1_V$, and $1_W$ is energized. When the trigger voltage is further applied to points O, P, and Q, the present phase will be shifted to the next phase, as determined by the position of switch 4, thereby causing rotation of the rotor in the appropriate direction.

Figure 5:
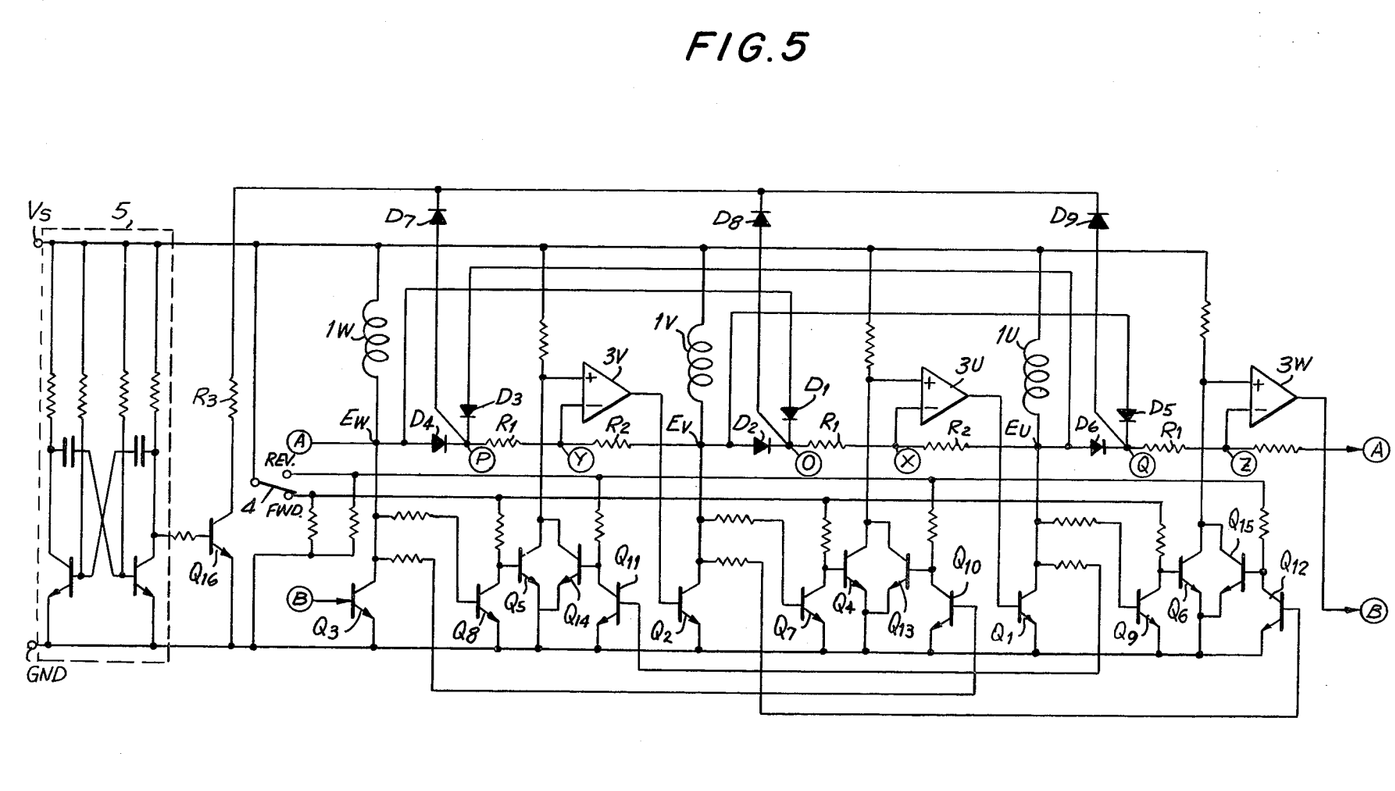
FIG. 5 is a schematic of another embodiment of the driving circuit of the present invention for driving a brushless DC motor in the forward or reverse direction and also for providing starting torque for the brushless DC motor.

In a further embodiment of the present invention, FIG. 5 shows a driving circuit having a motor starting circuit integrally arranged therewith. In the circuit of FIG. 5, a multivibrator 5 is the starting circuit to produce the trigger voltages used as described above. An output from multivibrator 5 is supplied to the base of transistor $Q_{16}$, the collector circuit of which provides an output through resistor $R_3$ that is fed to the trigger points O, P, and Q through diodes $D_7$, $D_8$, and $D_9$, respectively. When transistor $Q_{16}$ is turned ON, the potentials at trigger points O, P, and Q, will be at substantially ground potential, whereas, when transistor $Q_{16}$ is turned OFF, the trigger voltages at points O, P, and Q will be maintained at voltages lower than the power source voltage $V_S$ by an amount equal to the threshold voltage $V_F$ of diodes $D_2$, $D_4$, and $D_6$. At such time, one of the relationships described above at (4), (5) or (6), or at (7), (8), (9), will be satisfied, so that the appropriate coil is energized. When transistor $Q_{16}$ is once turned OFF and is subsequently turned ON, the present phase is shifted to the next phase as determined by the position of switch 4. As a result, the motor will be started in either the forward direction or in the reverse direction. Trigger pulses are applied to the trigger points O, P, and Q until stable synchronization of the rotor is accomplished. The trigger pulses may be applied to points X, Y, and Z in lieu of points O, P, and Q.

Figure 6:
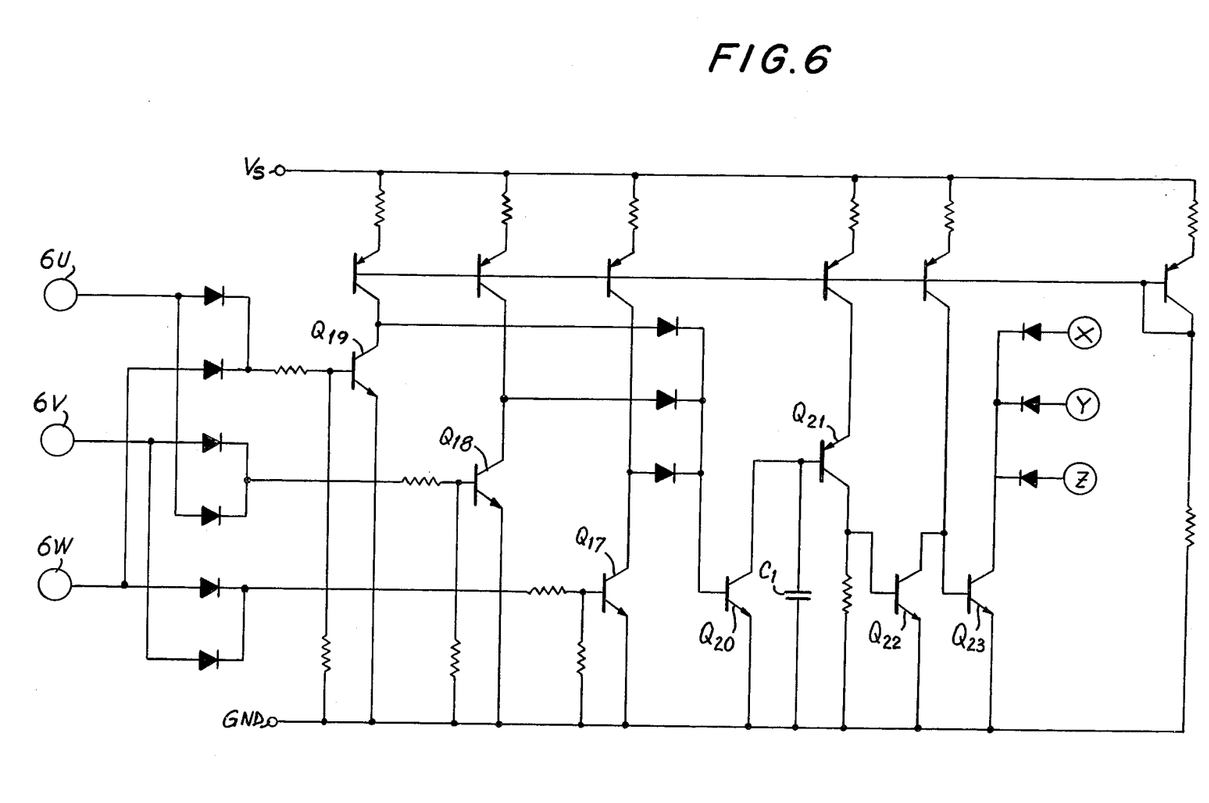
FIG. 6 is a schematic of another embodiment of a circuit suitable for starting a brushless DC motor using the driving circuit of the present invention.

Another embodiment of the driving circuit of the present invention utilizing a still different starting circuit is shown in FIG. 6. In the circuit of FIG. 6, the starting circuit is comprised of a sawtooth wave oscillator utilized in place of multivibrator 5 of the embodiment of FIG. 5. The ends of coils $1_U$, $1_V$, and $1_W$ that are normally tied together, that is, the ends opposite those to which the diodes are connected, respectively, to input end points $6_U$, $6_V$ and $6_W$. The detection points X, Y, and Z of the circuit of FIG. 5 are connected to output end points X, Y, and Z in the embodiment of FIG. 6. Similarly, points, X, Y, Z in FIG. 6 could be connected, respectively to points O, P, Q in the circuit of FIG. 5. The input end points $1_U$, $1_V$, and $1_W$ are maintained at voltages that are slightly lower than the power source $V_S$, and transistors $Q_{17}$, $Q_{18}$, and $Q_{19}$ are kept ON, transistor $Q_{20}$ is kept OFF, and transistor $Q_{21}$ is kept ON. In this fashion capacitor $C_1$ will be charged and during the charging period, a transistor $Q_{22}$ is ON and a transistor $Q_{23}$ is OFF. The output at points X, Y, and Z are maintained at substantially the power source voltage $V_S$ because transistor 23 is OFF. When one of the stator coils is energized, and capacitor $C_1$ is charged to a predetermined level, transistor $Q_{21}$ will turn OFF, transistor $Q_{22}$ is turned OFF, and transistor $Q_{23}$ is then turned ON. The input end points $1_U$, $1_V$, and $1_W$ and the output end points X, Y, and Z are set to substantially ground potential level. Accordingly, transistors $Q_{17}$, $Q_{18}$, and $Q_{19}$ are turned OFF and transistor $Q_{20}$ turns ON. This then discharges capacitor $C_1$ through transistor $Q_{20}$ and subsequently transistors $Q_{21}$ and $Q_{22}$ are turned ON and transistor $Q_{23}$ is turned OFF. This operation is repeated until stable synchronization of the rotor is achieved. Moreover, since transistors $Q_{17}$, $Q_{18}$, and $Q_{19}$ are turned OFF by the induced voltage from the energized coil, the sawtooth wave may not be permitted to oscillate any further.

Whereas, in the above described embodiments the voltages that were induced in the corresponding coils had sinusoidal waveforms, if the induced voltage does not have a sinusoidal waveform, the ratio of the resistance of the resistors $R_1$ to the resistance value of the resistor $R_2$ will be changed in accordance with the specific waveform of the induced voltage. As described above, according to the brushless DC motor driving circuit of the present invention, the predetermined waveform relationships among the induced voltages from the polyphase coils are detected. The corresponding coils are then sequentially energized in accordance with the detection signal, thereby obtaining a switching signal for determining the energization timing.

As may be seen from the above, the requirement for a discrete position detector, such as might be comprised of a Hall effect element, is eliminated, thus, decreasing the space required and leading to more compact equipment. Moreover, highly precision detection information is provided at exceeding low power consumption and wiring and assembling operations are simplified, thus, lowering equipment cost.

Following the teaching of the present invention described above, a prohibition signal, for example, a signal obtained from the collector voltage of transistor $Q_1$ of the embodiment of FIG. 4, is produced in accordance with the switching signal. One of the two adjacent coils, for example, the V-phase or W-phase coil with respect to the U-phase coil, may not be energized, for example, by controlling transistor $Q_9$ or $Q_{11}$ by means of transistor $Q_1$. Thus, switching of the motor rotational direction can thus be smoothly and properly performed.

As another advantage, triggering pulses are applied to points in the circuit, such as detection points O, P, and Q or detection points X, Y, and Z, at which the induced voltages of the respective phase calls appear so that the motor can be smoothly started in the predetermined direction.

Although an illustrative embodiment of the invention has been described in detail herein with reference to the accompanying drawings, it is to be understood that the invention is not limited to that precise embodiment, and that various changes and modifications may be effected therein by one skilled in the art without departing from the scope or spirit of the invention, as defined in the appended claims.

What is claimed is:

1. A driving circuit for a brushless DC motor of the kind having a stator with a plurality of windings, comprising:
    switching means connected to respective ones of said windings and to a power source for selectively supplying a driving current to said windings;
    means for comparing predetermined ratios of voltages induced in said windings by said driving current with a reference voltage and producing control signals representing the results of said comparing, said control signals being fed to said switching means for controlling the operation thereof, whereby said windings are selectively energized by said power source to cause said motor to produce optimum torque.

2. A driving circuit according to claim 1, in which said switching means comprises a plurality of transistors, at least one of said transistors connected in series with a respective one of said windings for selectively connecting said winding to said power source in response to said control signals from said means for comparing.

3. A driving circuit according to claim 1, in which said means for comparing includes a plurality of resistors of selected resistance values, said windings being connected at one end to said power source with at least two of said plurality of resistors being connected between the other ends of adjacent ones of said windings, whereby said predetermined ratios of voltages are provided by said resistors for comparison with said reference voltage.

4. A driving circuit according to claim 3, in which said means for comparing includes a plurality of voltage comparators, each having one input connected to said reference voltage and another input connected to a voltage dividing point between said at least two resistors.

5. A driving circuit according to claim 1, further comprising rotation direction control means for selecting a direction of rotation of said motor, said direction control means being connected to said switching means to control the order in which said switching means connects said windings to said power source.

6. A driving circuit according to claim 1, further comprising means for providing starting torque pulses to a selected one of said plurality of windings.

7. A driving circuit according to claim 6, in which said means for providing starting torque pulses comprises a multivibrator.

8. A driving circuit according to claim 6, in which said means for providing starting torque pulses comprises a sawtooth oscillator.

9. A circuit for driving a brushless DC motor of the kind having a plurality of stator windings, comprising:
controllable switch means for selectively connecting ones of said stator windings to a power source, thereby energizing selected ones of said windings;
means for determining predetermined voltage ratios of voltages induced in windings adjacent an energized winding;
means for controlling said switch means connected to compare said predetermined voltage ratios with a reference voltage for providing output signals to control switching operation of said switch means, thereby to energize said selected ones of said stator windings.

10. A circuit according to claim 9, in which said switch means comprises at least one transistor connected in series with a respective one of said stator windings for selectively connecting said winding to said power source in response to said means for controlling.

11. A circuit according to claim 9, in which said means for determining predetermined voltage ratios includes a plurality of resistors of selected resistance values, each of said plurality of stator windings being connected at one end to said power source and having at least two of said resistors connected between the other ends of adjacent ones of said windings, whereby said predetermined ratios of voltages are provided for said means for determining.

12. A circuit according to claim 11, in which said means for controlling comprises a plurality of voltage comparators each having one input connected to said reference voltage and another input connected to a voltage dividing point between said at least two resistors.

13. A circuit according to claim 9, further comprising rotation direction control means for selecting a direction of rotation of said motor, said direction control means being arranged to control the order in which said controllable switch means connects said windings to said power source.

14. A circuit according to claim 9, further comprising means for providing starting torque pulses to selected ones of said plurality of windings.

15. A circuit according to claim 14, in which said means for providing starting torque pulses comprises a multivibrator.

16. A circuit according to claim 14, in which said means for providing starting torque pulses comprises a sawtooth oscillator.

17. A circuit for use with a power source for driving a brushless DC motor of the kind having a plurality of stator windings, comprising:
means for producing detection voltages by mixing in predetermined ratios voltages induced in windings adjacent a winding energized by said power source;
switching means electrically connected between each of said plurality of stator windings and said power source for selectively connecting individual ones of said windings to said power source; and
controller means connected to receive said detection voltages for controlling said switching means upon comparing said detection voltages with a reference voltage and producing control signals fed to said switching means for selectively connecting said plurality of windings to said power source based upon the outcome of said comparisons.

18. A circuit according to claim 17, in which said switching means comprises at least one transistor connected in series with a respective one of said windings for selectively connecting said winding to said power source in response to said controller means.

19. A driving circuit according to claim 17, in which said means for producing detection voltages includes a plurality of resistors of selected resistance values, said windings being connected at one end to said power source and at least two of said resistors being connected between the other ends of adjacent ones of said windings, whereby said predetermined ratios are provided for said comparison with said reference voltage.

20. A circuit according to claim 19, in which said controller means comprises a plurality of voltage comparators each having one input connected to said reference voltage and another input connected to a voltage dividing point between said at least two resistors.

21. A circuit according to claim 19, in which said controller means includes means for providing said reference voltage to selected ones of said voltage comparators in response to the energization of said windings.

22. A circuit according to claim 17, further comprising rotation direction control means for selecting a direction of rotation of said motor, said direction control means being arranged to control the order in which said switching means connects said windings to said power source.

23. A circuit according to claim 17, further comprising means for providing starting torque pulses to selected ones of said plurality of windings.

24. A circuit according to claim 23, in which said means for providing starting torque pulses comprises a multivibrator.

25. A driving circuit according to claim 23, which said means for providing starting torque pulses comprises a sawtooth oscillator.

* * * * *